J. O. TYLER.
GEAR LOCK.
APPLICATION FILED SEPT. 27, 1918.
1,358,899.
Patented Nov. 16, 1920.
2 SHEETS—SHEET 1.
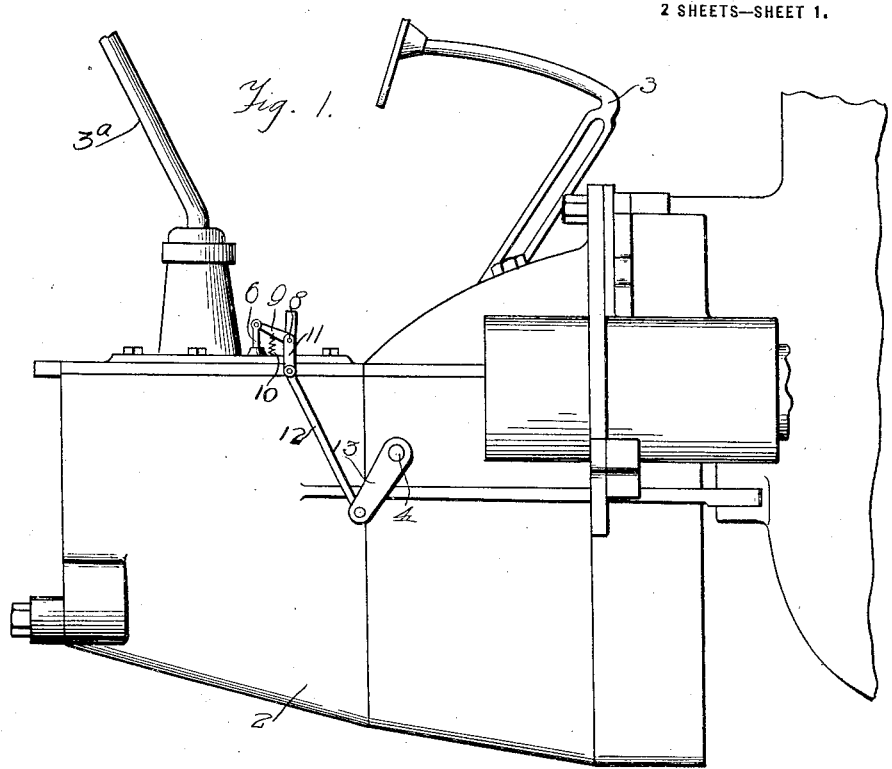
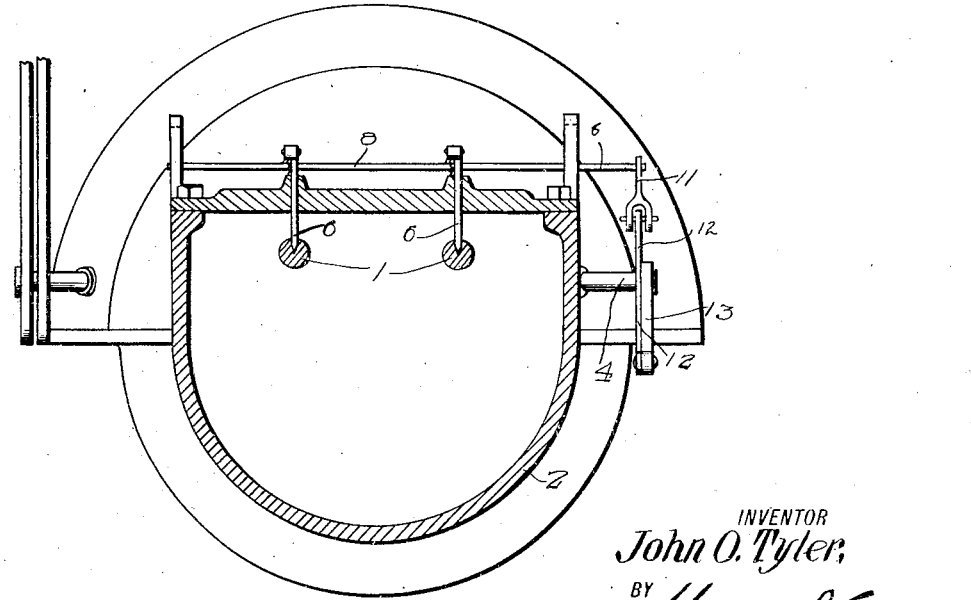
INVENTOR
John O. Tyler,
BY
ATTORNEYS J. O. TYLER.
GEAR LOCK.
APPLICATION FILED SEPT. 27, 1918.
1,358,899.
Patented Nov. 16, 1920.
2 SHEETS—SHEET 2.
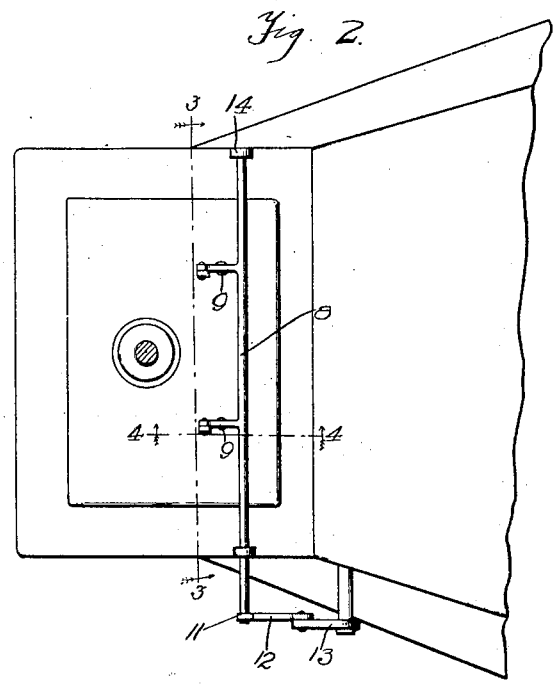
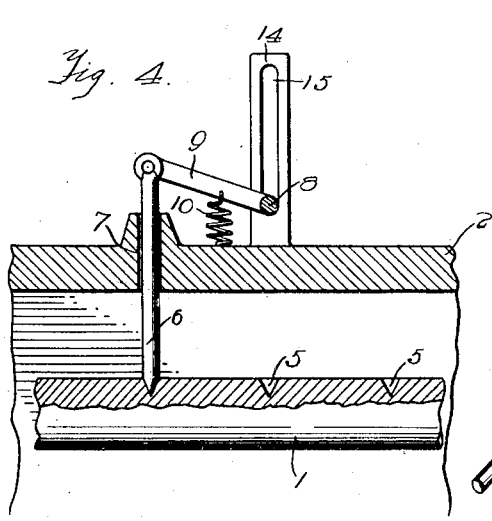
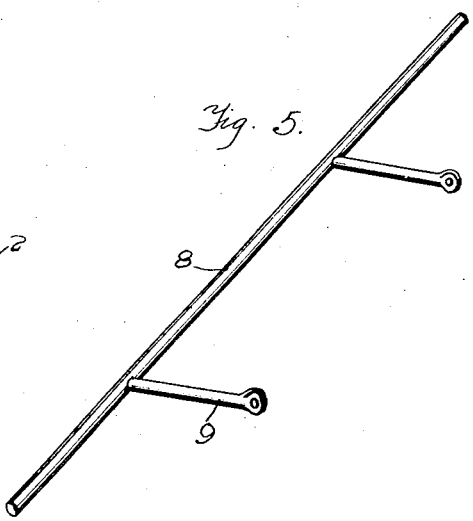
INVENTOR
*John O. Tyler.*
BY *Munn & Co*
ATTORNEYS

UNITED STATES PATENT OFFICE.

JOHN O. TYLER, OF WINCHESTER, KENTUCKY.

GEAR-LOCK.

1,358,899.

Specification of Letters Patent.

Patented Nov. 16, 1920.

Application filed September 27, 1918. Serial No. 255,935.

*To all whom it may concern:*

Be it known that I, JOHN O. TYLER, a citizen of the United States, and a resident of Winchester, in the county of Clark and State of Kentucky, have invented a new and useful Improvement in Gear-Locks, of which the following is a specification.

My invention is an improvement in gear locks and has for an object to avoid the difficulties resulting from drivers, especially beginners, failing to hold the clutch down when they go to shift the gears, and the invention seeks to provide means whereby the gears are locked in position and are not able to be moved by the gear shift rod until the clutch is depressed, and the invention consists in certain novel constructions and combinations of parts as will be hereinafter described and claimed.

In the drawings:—

Figure 1 is a side view of a transmission mechanism provided with the improved lock, Fig. 2 is a top plan view, Figs. 3 and 4 are sections on the lines 3—3 and 4—4 respectively, of Fig. 2, Fig. 4 being enlarged, Fig. 5 is a perspective view of the controlling rod.

The present embodiment of the invention is shown in connection with the gear shifting rods 1 of the transmission (not shown) which is arranged within the casing 2. The movement of the rods 1 and the shifting of the gears is controlled by the lever $3^a$ in the usual manner, the said lever permitting the driver to select the gear he wishes to use. The clutch operated through the treadle 3, when depressed, permits the gears to mesh properly and supplies the necessary friction between the motor and the driving wheels. It is necessary in the operation of a car with sliding gear transmission that there should be an intimate relation between the operation of the clutch pedal and the gear shift lever, that is, at the instant of engaging the gears by means of the gear shift lever the clutch pedal should be depressed; otherwise an annoying, grating and dangerous clashing of gears will occur. In the present invention it is designed to make impossible the moving of the gear shift lever and the concurrent movement of the rods 1 until the clutch is depressed, thus making it absolutely necessary for the driver to follow the correct procedure in shifting gears.

The rods 1 are movable longitudinally in the casing 2 by means of the lever $3^a$ and the present mechanism insures that they will be locked in position until the clutch is depressed to prevent clashing, battering and stripping of the gears.

Each rod 1 has a series of notches 5 in its upper surface and these notches are adapted to be engaged by the pointed lower end of a pin 6 which is mounted to slide through a nipple 7 in the top of the casing 2. A shaft 8 is mounted transversely of the top of the casing 2 just in front of the pins 6 and this shaft has forwardly extending arms or cranks 9, which are pivoted to the respective pins.

Each crank or arm 9 is normally drawn downwardly, that is, each pin 6 is normally pressed into engaging position by means of a coil spring 10 arranged between the arm 9 and the casing. The shaft 8 has connected with one end thereof a crank arm 11, and the crank arm is connected by a link 12 with a crank arm 13 on the adjacent end of the shaft 4. The shaft 8 is supported by a standard 14 which is vertically slotted as shown at 15, to receive the shaft, and the shaft is vertically movable in the slot, being normally held down, however, by the springs 10.

In operation, when the clutch pedal 3 is depressed, the movement in addition to operating the clutch transmits motion to the pin 6 by means of the arms 11 and 13, the link 12 and the shaft 8 raising them out of the notches in the gear shifting rods, thereby permitting the gears to be shifted in the usual manner, while at the same time positively preventing the shifting of the gears, until the clutch is depressed.

As is known, drivers, especially beginners, frequently fail to move the clutch down when they are ready to shift the gears, and the present device is intended to lock the gears until the clutch is depressed, thus preventing the stripping of the gears or battering of the same.

But a very slight lifting movement of the pins 6 is necessary in order that they may free the rods 1. Hence the shaft 8 is mounted to move vertically so that free movement of the clutch shaft is permitted without binding of the pins 6 in the opening 7, which would be the case were such pins lifted beyond a predetermined point. Should the pins bind in the slot through excess movement of the clutch shaft, the springs will permit the shaft 8 to move upwardly. The springs normally hold the shaft at the bottoms of the slots.

I claim:—

In combination with the clutch controlling shaft and the gear shifting rods of a transmission, vertically movable pins disposed above said rods and slidable through the cover of the transmission casing, said rods each having a plurality of notches for engagement by the pins whereby to hold the rods in adjusted positions, a bearing member secured upon the transmission cover at one side thereof and provided with a vertical slot, a horizontal shaft located above the transmission cover transversely thereof and having one end journaled within said slot, crank arms on said shaft connected with the upper ends of said pins, springs connected with said arms and with the transmission cover whereby to draw said shaft normally downwardly with said pins engaging said rods, and a link connected with the other end of said shaft and operatively connected with the clutch controlling shaft whereby upon depression of the clutch control pedal associated with the clutch controlling shaft said pins and the shaft associated therewith will be moved vertically out of engagement with said notches.

JOHN O. TYLER.

Witnesses:
G. W. BRASHEAR,
JOHN W. BAYLESS.